US005787482A

United States Patent [19]
Chen et al.

[11] Patent Number: 5,787,482
[45] Date of Patent: Jul. 28, 1998

[54] DEADLINE DRIVEN DISK SCHEDULER METHOD AND APPARATUS WITH THRESHOLDED MOST URGENT REQUEST QUEUE SCAN WINDOW

[75] Inventors: Shenze Chen, Cupertino; Manu Thapar, Fremont, both of Calif.

[73] Assignee: Hewlett-Packard Company, Palo Alto, Calif.

[21] Appl. No.: 509,074

[22] Filed: Jul. 31, 1995

[51] Int. Cl.$^6$ ............................ G06F 13/00; G06F 13/28
[52] U.S. Cl. .................... 711/158; 395/826; 395/672; 395/673; 395/607; 395/859; 395/874; 711/112; 348/7
[58] Field of Search ........................... 395/439, 112, 395/478, 151, 485, 158, 826, 859, 860, 607, 672, 673, 874; 348/7

[56] References Cited

U.S. PATENT DOCUMENTS

| | | | |
|---|---|---|---|
| 4,604,687 | 8/1986 | Abbott | 395/616 |
| 5,522,054 | 5/1996 | Gunlock et al. | 711/112 |
| 5,544,313 | 8/1996 | Shachnai et al. | 395/200.01 |
| 5,581,784 | 12/1996 | Tobagi et al. | 395/826 |
| 5,592,612 | 1/1997 | Birk | 395/182.04 |
| 5,644,786 | 7/1997 | Gallagher et al. | 395/850 |

OTHER PUBLICATIONS

Carlos A. G. Pico et al., "Dynamic Scheduling of Computer Tasks Using Genetic Algorithms", 1994, Evolutionary Computation, 1994 Conference, pp. 829–833.

Huanxu Pan et al., "A Time–Scale Depedent Disk Scheduling Scheme for Multimedia–on–Demand–Servers", Multimedia Computing and Systems, 1996 Int'l. Conference pp. 572–579.

Lon–Chan Chu, et al., "Optimization in Real Time", Real–Time Systems, 1991 symposium, pp. 150–159.

Alberto Avritzer et al., "A Load Sharing Interconnection Network for Hard* Real–Time Systems", Parallel Processing, 1991 Symposium, pp. 591–598.

Seltzer, M. et al. "Disk Scheduling Revisited," Proc. of the Winrter '90 USENIX Conf., pp. 22–26, Jan. 1990.

Yu, P. et al., "Grouped Sweeping Scheduling for DASD–based Multimedia Storage Management", Multimedia Systems Journal, 1:9–109, 1993.

Gemmel, D.J. et al., Multimedia Network Serves: Multi–Channel Delay Sensitive Data Retrieval, Multimnedia Systems, 1(6):240–252, 1994.

Denning, Peter J., "Effects of Scheduling on File Memory Operations,"Proc. of the AFIPS Spring Joint Computer Conf. pp. 9–21, 1967.

Teory, T. J., "Poperties of Disk Scheduling Policies in Multiprogrammed Computer Systems,"Proc. of the AFIPS Fall Joint COmputer Conf. pp. 1–11, 1972.

Teory, T. J. et al., A Comparative Analysis of Disk Scheduling Policies, Comm. of the ACM, vol. 15, No. 3, pp. 177–184, Mar. 1972.

Peterson, J. L. et al., Operating System Concepts, 2nd. Ed. Addison–Wesley Publishing Company, 1985.

(List continued on next page.)

*Primary Examiner*—Eddie P. Chan
*Assistant Examiner*—Hong C. Kim
*Attorney, Agent, or Firm*—Timothy Rex Croll

[57] ABSTRACT

A disk control mechanism for controlling the operations of a movable arm disk drive. The disk control mechanism contains a disk access scheduler which accepts disk access requests having a deadline and a disk location. The disk access scheduler further consists of a queue data structure for storing the requests. The queue contains a predefinded window that contains a certain number of requests with deadlines to expire sooner than all other requests. The request that is most soon to expire, the most urgent request, is located at the head of the queue. The disk access scheduler contains logic to determine whether the most urgent request has a deadline to expire sooner than tolerated by a set threshold, and in such cases the disk access scheduler schedules for service the most urgent request prior to any other request, otherwise it scans towards the most urgent request and schedules requests with a disk location between the current arm location and the most urgent request.

7 Claims, 7 Drawing Sheets

OTHER PUBLICATIONS

Coffman, E.G. et al., Analysis of Scanning Policies for Reucing Disk Seek Times, SIAM J. of Computing, vol. 1, No.3, Sep. 1972.

Wilhelm, N.C. "An Anomaly in Disk Scheduling: A Comparioson of FCFS and SSTF Seek Scheduling using an Empirical Model for Disk Accesses," Comm. of the ACM, vol. 19, No. 1, pp. 13–17, Jan. 1976.

Hofri, M., "Disk Scheduling: FCFS vs. SSTF Revisted, "Comm. of the ACM, vol. 23, No. 11, pp. 645–653, Nov. 1981.

Frank, H., "Analysis and Otimization of Disk Storage Devices for Time–Sharing Systes," J. of ACM, vol. 16, NO. 4, pp. 602–620, Oct. 1969.

Gotlieb, C.C. et al., "Performance of Movable–Head Disk Scheduling Disciplines," J. of the ACM, vol. 20, No. 4, pp. 604–623, Oct. 1973.

Fuller, S.H., "Minimal–Total–Processing–Time Drum and Disk Scheduling Disciplines," Comm. of the ACM, vol. 17, No. 7, pp. 376–381, Jul. 1974.

Perros, H.G., "A Regression Model for Predicting the Response Time of a Disk I/O System," Computer J., vol. 23, No. 1, pp. 34–36, Feb. 1980.

Liu, C. L. et al., "Scheduling Algorithms for Multiprogramming in a Hard Real–Time Environment," J. ACM vol. 20, pp. 46–61, No. 1, Jan. 1973.

Abbott, R. et al., Scheduling I.O Request with Deadlines: A Performance Evaluation, Proc. of Real–Time Systems Symposium, pp. 113–124, 1990.

Reddy, A.L. et al. . et al. ., "I/O Issues in a Mulitimedia System," Computer, 27(30):69–74, 1994.

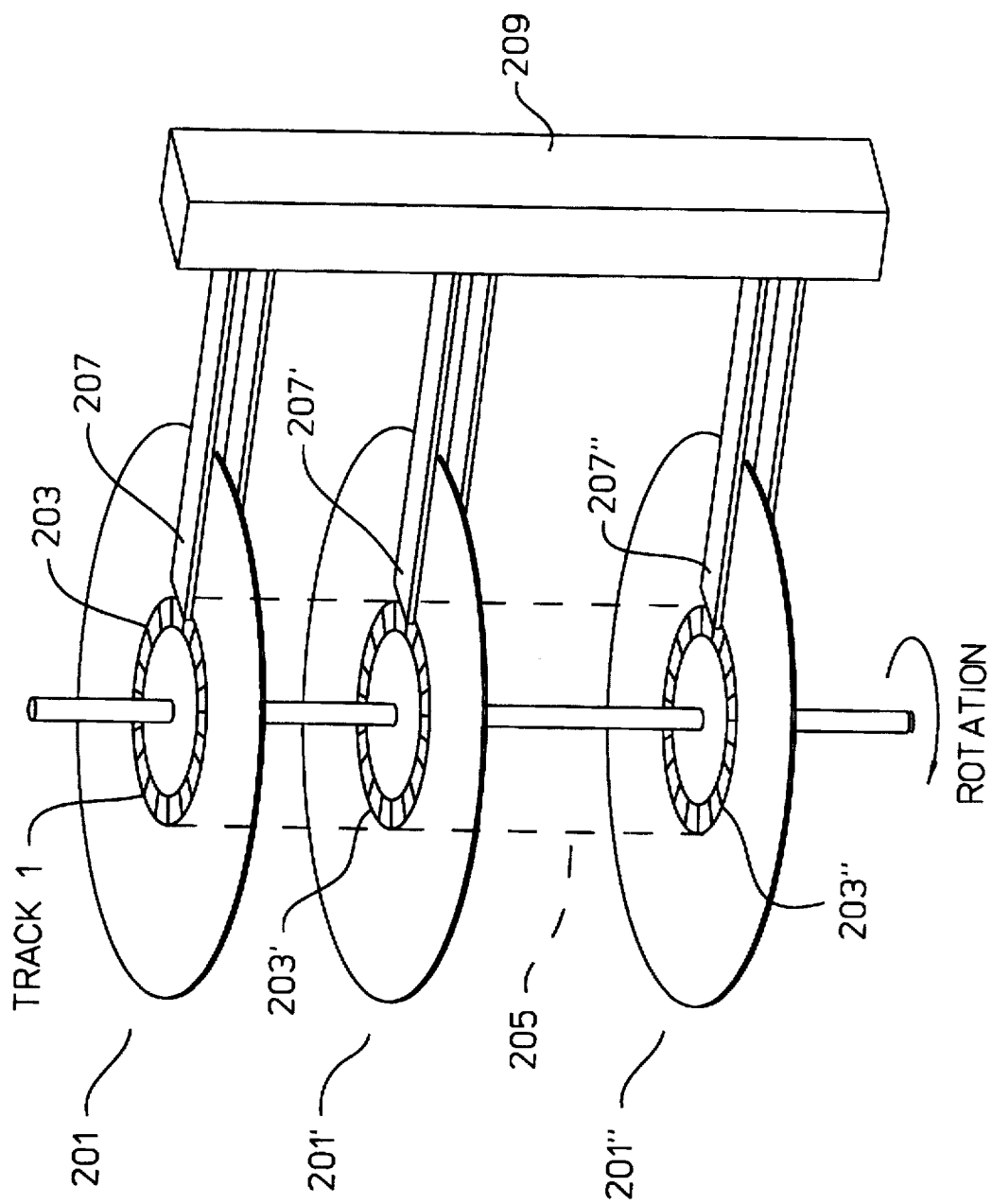

DEADLINE DRIVEN DISK SCHEDULER METHOD AND APPARATUS WITH THRESHOLDED MOST URGENT REQUEST QUEUE SCAN WINDOW

BACKGROUND OF THE INVENTION

1. Field of the Invention

This invention relates generally to disk schedulers, and, more particularly to disk schedulers for applications requiring real-time retrieval of information from moving-head disk storage devices.

2. Background of the Related Art

Many modern computer applications require huge amounts of data. In some applications this data must be retrieved in real-time. Examples of such applications may be found in the multi-media field, for example, the video delivery service known as "video-on-demand" and audio playback systems.

One of the next generation video delivery services is the so called "video-on-demand" service. The video-on-demand service combines the features of cable-television and video cassette recorders (VCR). Like cable-television, video-on-demand systems originate video presentations, such as movies, recorded sports events and news shows. However, unlike cable-tv, but like VCRs, in video-on-demand systems, a viewer can select the programs they wish to view. Furthermore, the viewers can control the playback of programs, e.g., pausing, fast-forward, fast-reverse, etc. Also, unlike cable-tv, video-on-demand allows viewers to start the presentation of a program at their own convenience.

In a video-on-demand system, many viewer stations, for example, those located in private homes and businesses, are connected to one or more video servers. A video server is a computer with very large disk storage capacity for storing video programs. The video server is one of the key components in providing "video-on-demand" service. Video servers differentiate themselves from traditional file servers or database systems in the following major aspects:

Large Storage Capacity

Multi-media applications tend to require very large storage capacities. For example, on the average, each compressed movie needs about 2 to 3 GB (giga-bytes) of storage space. For a large scale video server, which stores hundreds or even thousands of movies, hundreds giga-bytes or even tera-bytes of storage space will be required;

Intensive Disk I/O Traffic

Video applications (as well as other multi-media applications) generate a large amount of I/O requests. For example, at a 3 Mbit/sec of stream bit rate and 128K bytes of I/O transfer size, if 200 concurrent movie streams are requested, then the video server needs to support sustained 600 I/O requests per second;

Large I/O Transfer Size

Disk utilization is directly related to the I/O transfer size. In general, disk service time consists of three components: seek time, rotational latency, and data transfer time. Among the three, only increased data transfer time directly contributes to improved disk utilization; rotational latency and seek time are overhead.

Real-Time Disk I/O

Movie streams must be continuously played back. Any discontinuity will result in a glitch on the viewer's screen. Therefore, in a video server, in order to provide the "quality-of-service", movie data must be retrieved from storage disks in a real-time fashion. The primary I/O performance metric for such a system is no longer the "mean response time", as for the traditional file servers or transaction processing systems. Instead, we are more concerned about the number of I/O's which miss their deadlines.

A number of disk scheduling algorithms have appeared in the literature or are used in today's commercial systems. These algorithms can be divided into two categories, non-real-time algorithms and real-time algorithms. There are still disadvantages to these disk scheduling methods that need to be solved for real-time processing of video playback requests.

FIG. 2 is an illustration of a moving-head disk drive. The disk drive consists of a number of parallel spinning disks, also known as platters. Each disk is coated with a recording material. The surface of each disk is logically divided into tracks. For each track on one disk there are corresponding parallel tracks on the other disks. This set of tracks form a cylinder. The information on the disks are read (and written) by read/write heads mounted on an arm. The arm is fashioned such that all the tracks in one cylinder are addressed in parallel.

Non-Real-Time Algorithms:

A common feature of all non-real-time algorithms is that none of them takes the time constraint (if any) of requests into account.

First-come-first-serve (FCFS)

First-come-first-serve is the simplest way of servicing I/O requests. It does not require any sophisticated way of maintaining queues or doing scheduling. Its performance, as can be expected, is the worst since it does not perform any optimization based on I/O characteristics. It was used in early systems or some small systems where the I/O traffic is small.

SCAN

In the SCAN algorithm, which is also known as the "elevator" algorithm, the arm moves in one direction and serves all requests in that direction until there are no requests in that direction. The arm then changes its scan direction and repeats the operation. The main advantage of the SCAN algorithm is the reduction of disk seek times. The problem is that, if a request arrives to one end of the disk, and just misses the arm scan, then it may have to wait a long time before the arm scans back.

Circular SCAN (C-SCAN)

The Circular SCAN is a variation of the SCAN algorithm. It works the same way as SCAN except that it always scans in one direction. After serving the last request in the scan direction, the arm returns to the start position (e.g. one edge of the disk) without servicing any requests and begins scanning again. The advantage of the C-SCAN algorithm is that it provides a more uniform wait time for I/O requests, as compared to SCAN.

Shortest-Seek-Time-First (SSTF)

The SSTF algorithm, stands for "Shortest-Seek-Time-First", selects the request with minimum seek time from the current arm position. Since seek time is proportional to the number of tracks the arm crosses, this algorithm is implemented by moving the head to the closest track in the request queue. While the SSTF might achieve an optimal seek time, as its name suggests, it suffers from the starvation problem to those requests away from the current arm position.

Shortest-Time First (STF)

Unlike SSTF, which selects the request with the shortest seek time, the "Shortest-Time-First" (STF) selects the one with the shortest I/O time, including both seek and rotational latency. This algorithm requires some hardware support in order to determine the rotation time for each request.

There are two variations of the STF algorithm:

GSTF—Grouped STF, which divides a disk into cylinder groups and perform STF within each group. It services all requests in a group before moves to the next group.

WSTF—Weighted STF, which perform the STF technique, but applies an aging function to the time computed by STF. The aging function is determined by the elapsed time since a request arrived.

Both of the two variations are aimed at solving the starvation problem of the original STF algorithm, and they are studied in an environment where I/O queue length is assumed to be very long (up to 1000).

Grouped Sweeping Scheme (GSS)

In the "Grouped Sweeping Scheme" (GSS), movie retrievals are serviced in a service round. Within each round, requests are partitioned into groups and each group is served in a fixed order in a round. The SCAN algorithm is applied within each group. The number of groups (or the group size) can be tuned to achieve a better performance.

FCFS, SCAN, C-SCAN, and SSTF are described in:

Denning, Peter J., "Effects of Scheduling on File Memory Operations," Proc. of the AFIPS Spring Joint Computer Conf. pp. 9–21, 1967.

Teorey, T. J., "Properties of Disk Scheduling Policies in Multiprogrammed Computer Systems," Proc. of the AFIPS Fall Joint Computer Conf. pp. 1–11, 1972.

Teorey, T. J. and Pinkerton, T. B., "A Comparative Analysis of Disk Scheduling Policies," Comm. of the ACM, Vol. 15, No. 3 pp. 177–184, March 1972.

Peterson, J. L. and Silberschatz, A., Operating System Concepts, 2nd Ed. Addison-Wesley Publishing Company, 1985.

The performance issues on these algorithms are discussed in:

Coffman, E. G., Klimko, L. A., and Ryan, B., "Analysis of Scanning Policies for Reducing Disk Seek Times," SIAM J. of Computing, Vol. 1, No. 3, September 1972.

Wilhelm, N. C., "An Anomaly in Disk Scheduling: A Comparison of FCFS and SSTF Seek Scheduling using an Empirical Model for Disk Accesses," Comm. of the ACM, Vol. 19, No. 1, pp 13–17, January 1976.

Hofri, M., "Disk Scheduling: FCFS vs. SSTF Revisited," Comm. of the ACM, Vol. 23, No. 11, pp. 645–653, November 1981.

Frank, H., "Analysis and optimization of Disk Storage Devices for Time-Sharing Systems," J. of ACM, Vol. 16, No. 4, pp. 602–620, October 1969.

Gotlieb, C. C. and MacEwen, G. H., "Performance of Movable-Head Disk Scheduling Disciplines," J. of the ACM, Vol. 20, No. 4, pp. 604–623, October 1973.

Fuller, S. H., "Minimal-Total-Processing-Time Drum and Disk Scheduling Disciplines," Comm. of the ACM, Vol. 17, No. 7, pp. 376–381, July, 1974.

Perros, H. G., "A Regression Model for Predicting the Response Time of a Disk I/O System," Computer J. Vol. 23, No. 1, pp. 34–36, February 1980.

The STF algorithm is discussed in:

Seltzer, M., Chen, P., and Ousterhout, J., "Disk Scheduling Revisited," Proc. of the Winter '90 USENIX Conf., pp. 22–26, January 1990.

The GSS algorithms is discussed in:

Yu, P., Chen, M. S., and Kandlur, D. D., "Grouped Sweeping Scheduling for DASD-based Multimedia Storage Management", Multimedia Systems Journal, 1:99–109, 1993.

Gemmel, D. J., and Han, J., "Multimedia Network Servers: Multi-Channel Delay Sensitive Data Retrieval", Multimedia Systems, 1(6):240–252, 1994.

Real-Time Algorithms:

Several methods for scheduling disk accesses to achieve real-time retrieval have been proposed. The real-time scheduling algorithms are designed to help I/O requests to meet their deadlines. Therefore, these methods take the time constraints into account when scheduling I/O requests for service.

Earliest-Deadline-First (EDF):

EDF was originally designed for processor scheduling. When applied to disks, the algorithm simply selects the request with the earliest deadline for service. An advantage of this algorithm is that it is simple and easy to implement. However, a weakness of EDF is that because the algorithm does not consider the arm position and perform any seek optimization, the disk access time on average is very high.

The EDF scheduling algorithm is described in:

Liu, C. L and Layland, J. W., "Scheduling Algorithms for Multiprogramming in a Hard Real-Time Environment," J. ACM vol. 20, pp. 46–61, No. 1, January 1973; and Towsley, D. and Panwar, S. S., "On the Optimality of Minimum Laxity and Earliest Deadline Scheduling for Real-Time Multiprocessors," Proc. Euromicro '90 Workshop on Real-Time, pp. 17–24, 1990.

Feasible-Deadline-SCAN (FD-SCAN)

FD-SCAN is proposed for real-time transaction processing. In FD-SCAN, the track location of the request with earliest feasible deadline is used to determine the scan direction. A deadline is feasible if we estimate that it can be met. At each scheduling point, all requests are examined to determine which has the earliest feasible deadline. After selecting the scan direction, the arm moves towards that direction and serves all requests along the way.

Even though FD-SCAN takes into account both deadline information and arm position when scheduling, it nevertheless suffers from at least two weaknesses. First, its run-time scheduling overhead may be high, because it needs to check if the previous scan target request is still feasible, and if not, a new direction must be determined. Second, if there are many requests between the arm position and the target request that has the earliest deadline, then the target request is likely to miss its deadline.

The "Feasible-Deadline-SCAN" (FD-SCAN) algorithm is described in:

Abbot, R. and Garcia-Molina, H., "Scheduling I/O Requests with Deadlines: A Performance Evaluation," Proc. of Real-Time Systems Symposium, pp. 113–124, 1990.

SCAN-EDF

Recently, Reddy and Wyllie have described a hybrid of the SCAN and EDF algorithms:

Reddy, A. L. Narasimha and Wyllie, James C., "I/O Issues in a Multimedia System," Computer, 27(3):69–74, 1994.

In SCAN-EDF, requests are normally served in EDF order. However, if more than one request have the same deadline, the SCAN algorithm is applied to these requests.

The advantage of SCAN-EDF is that it attempts to provide both seek optimization and earliest deadline first service. However, the effectiveness of the SCAN-EDF algorithm depends on how many requests carry the same deadline. If a server dynamically issues I/O requests, then the chance for more than two requests to have the same deadline is small or zero. In that case, the algorithm reduces to EDF. On the other hand, if a server uses "service round", and all requests during a round are assigned the same deadline, then the algorithm reduces to SCAN. Therefore, the behavior of this algorithm really depends on how deadlines are assigned to I/O requests.

SUMMARY OF THE INVENTION

It is an object of the invention to provide a real-time disk access scheduler.

It is another object of the invention to schedule the request with the earliest deadline (hereinafter, the request with the earliest deadline will be referred to as "the most urgent request") for next service when its deadline is too near expiration to allow other disk access requests to be serviced prior to the most urgent request.

It is a further object of the invention to provide a disk access scheduler that schedules certain disk access requests that are less urgent than the most urgent request when the most urgent request can wait without missing its deadline.

It is yet another object of the invention to provide high disk utilization while satisfying real-time constraints.

The above and other objects of the invention are satisfied by providing a disk scheduler that maintains a sorted queue of disk access requests. Each request in the queue bears an address and a deadline. The queue is sorted by deadline. Thus, at the head of the queue is the most urgent request.

A window of predefined number of requests is located at the head of the queue. It contains the predefined number of requests that are more urgent than all other requests in the queue. When scheduling a disk access operation, the scheduler first determines whether the difference between the current time and the deadline for the most urgent request is less than a predefined threshold. The threshold is set to be sufficiently large to allow the disk to service both the most urgent request and another request. If the threshold is not satisfied, the disk access scheduler schedules for next service the most urgent request, bypassing all other requests. If, on the other hand, the most urgent request is not within the threshold, the disk scheduler scans from the current disk arm location in the direction of the most urgent request. If during this scan, it encounters a disk access request that is both on the path from the current arm location to the location of the most urgent request, and is in the window, the disk scheduler schedules that encountered request.

After having scheduled for service a request, the disk scheduler removes that request from the queue and when scheduling another request returns to the step of testing the expiration of the deadline of the most urgent request, and so on.

Still other objects and advantages of the present invention will become readily apparent to those skilled in this art from the detailed description, wherein we have shown and described the preferred embodiments of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The invention is best understood by referring to the drawings accompanying this specification in which like numerals represent like elements. As a convention, elements bearing a reference numeral followed by a single or multiple apostrophes is an identical element or similar to, but a variation of, the element bearing the numeral without an apostrophe and any other elements with the same reference numeral but having a different number of apostrophes.

FIG. 2 is a schematic illustration showing in greater detail a moving-head disk drive mechanism of the "Video-on-demand" system of FIG. 1.

DETAILED DESCRIPTION OF THE DRAWINGS

Figure 1:
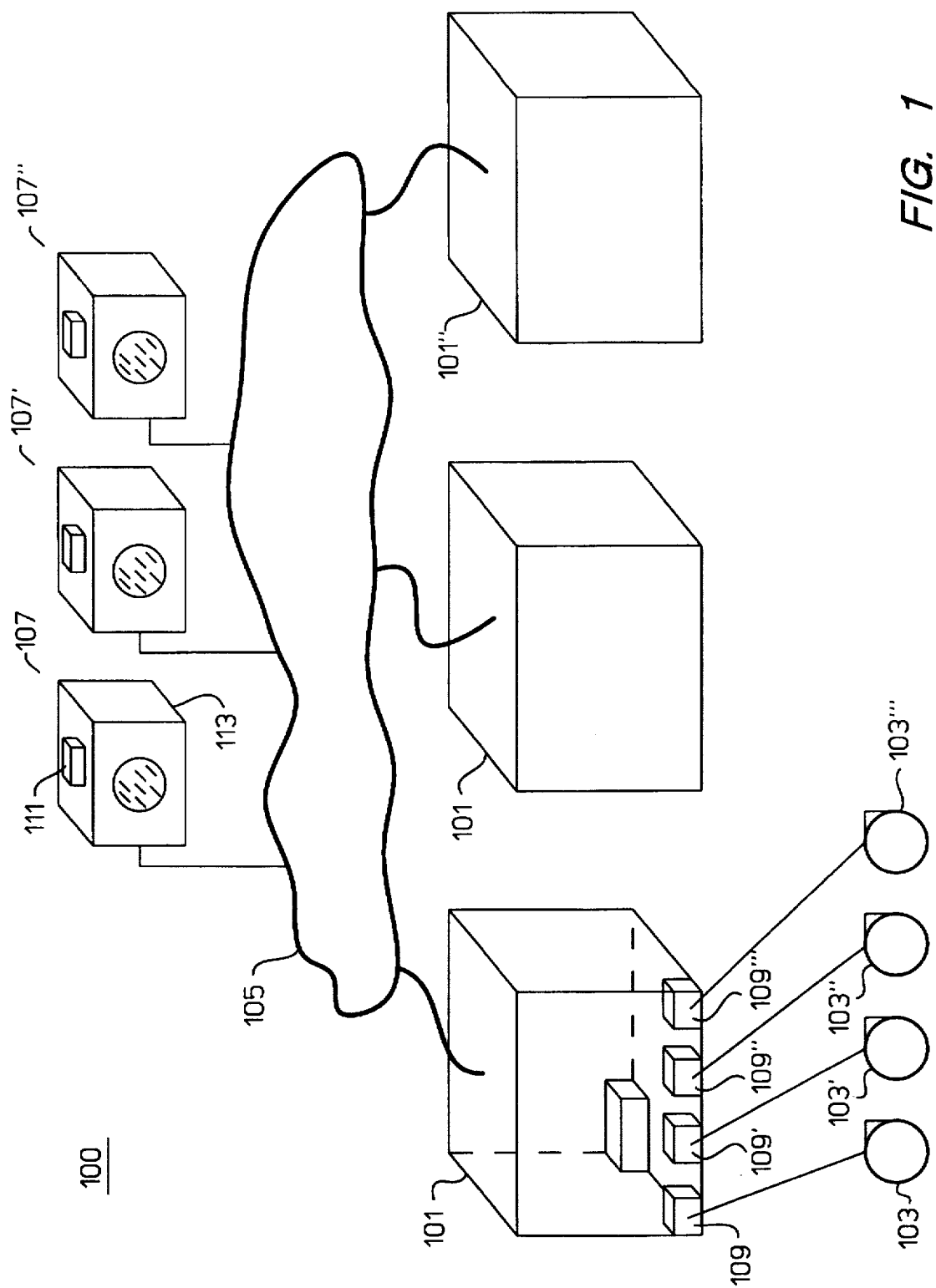
FIG. 1 is a schematic showing a "Video-on-demand" system, including a plurality of video servers.

FIG. 1 is a schematic showing a "Video-on-demand" system 100. A key component of the system 100 are the video servers 101. In an actual implementation of a "video-on-demand" system there may be one or many video servers 101. Each video server 101 contains a bank of storage devices 103. While in the illustration of FIG. 1 four disk drives are attached to the video server 101, this is solely for illustrative purposes as there is not a specific number of storage devices 103 for each video server 101. The storage devices are moving head disk drives, e.g., disk drive 103 shown in FIG. 2.

The video servers 101 are connected via a network 105 to viewer sets 107. Each viewer set 107 consists of a monitor 113 and a control unit 111. In alternative embodiments the monitor 113 and control unit 111 may be integrated into one unit. The network 105 may be a two-way cable television network, a telephone network, or other wide-area network, or a local-area network.

The video servers 101 contain stored video programming such as movies, news programs, and recorded sporting events. This programming is stored in digital form on the disk drives 103. A particular program may be "striped" onto several disks 103, wherein sequential data is located on separate disks, thereby avoiding overloading particular disk drives with more popular material.

FIG. 2 is a schematic illustration showing moving-head disk drive mechanism 103 in greater detail. The disk drive 103 contains a plurality of parallel disks 201. Each disk 201 is coated with a recording material, e.g., a magnetic material, on which data can be stored. The data is logically organized on each disk in tracks, such as tracks 203. For each track 203 on one disk there is a parallel track on the other disks 203. The collection of these parallel tracks 203 form a cylinder 205. Thus, a block of data may be addressed by the disk it is located on and the cylinder in which it is located.

The disk drive 103 further consists of a plurality of parallel read/write heads 207. Each read/write head 207 is attached to an arm 209. The arm 209, upon instructions from a disk controller (See FIG. 3 and the discussion below) operates to move the read/write heads 207 so as to access a particular cylinder. Typically the read/write heads 207 are configured such that, at a given point in time, all the read/write heads 207 are aligned with tracks 203 in the same cylinder 205.

Returning to FIG. 1, a disk scheduler 109 schedules the access to data on each individual disk drive 103.

Figure 3A:
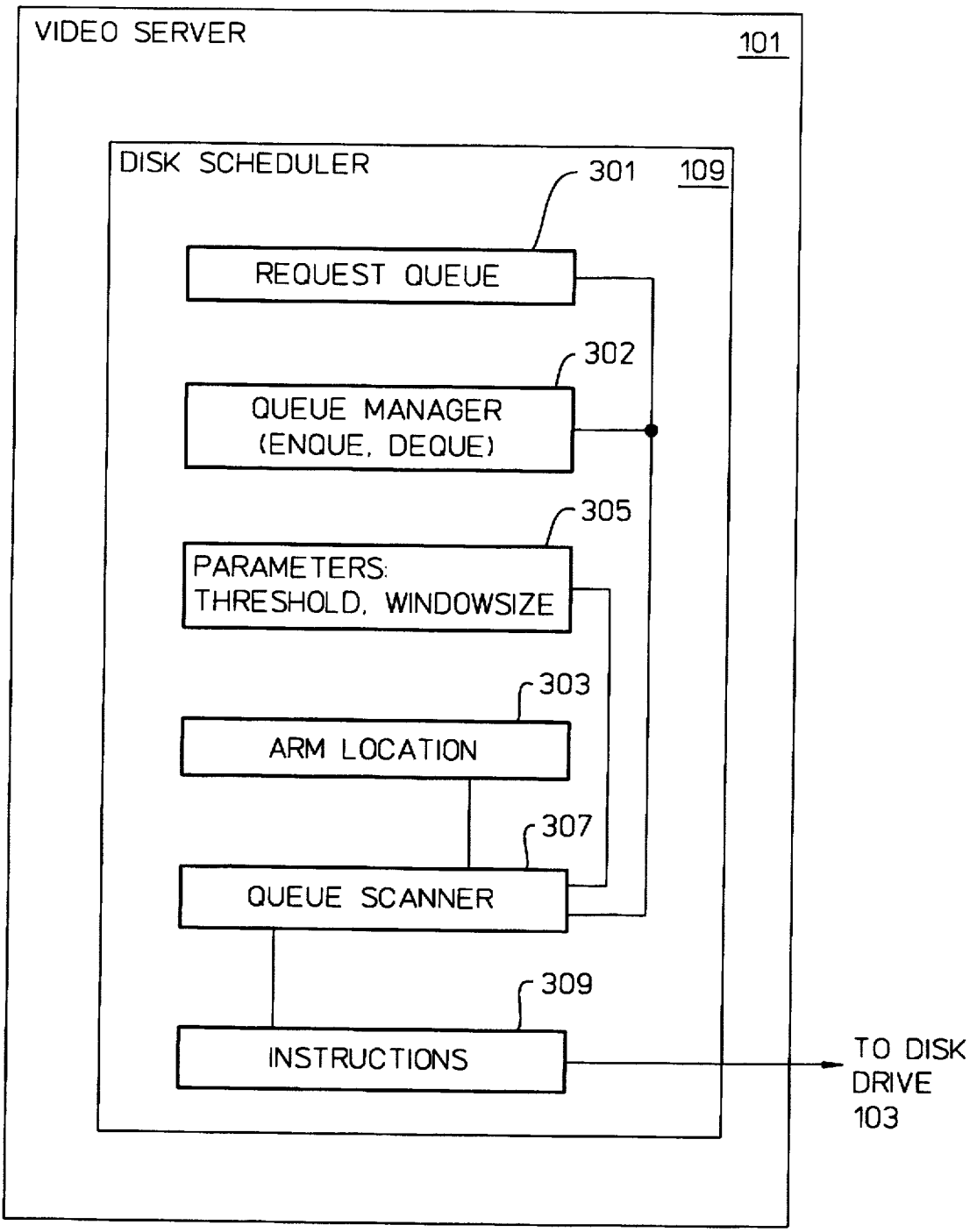
FIG. 3a is a block diagram of a video server including a disk scheduler according to a preferred embodiment of the invention.
Figure 3B:
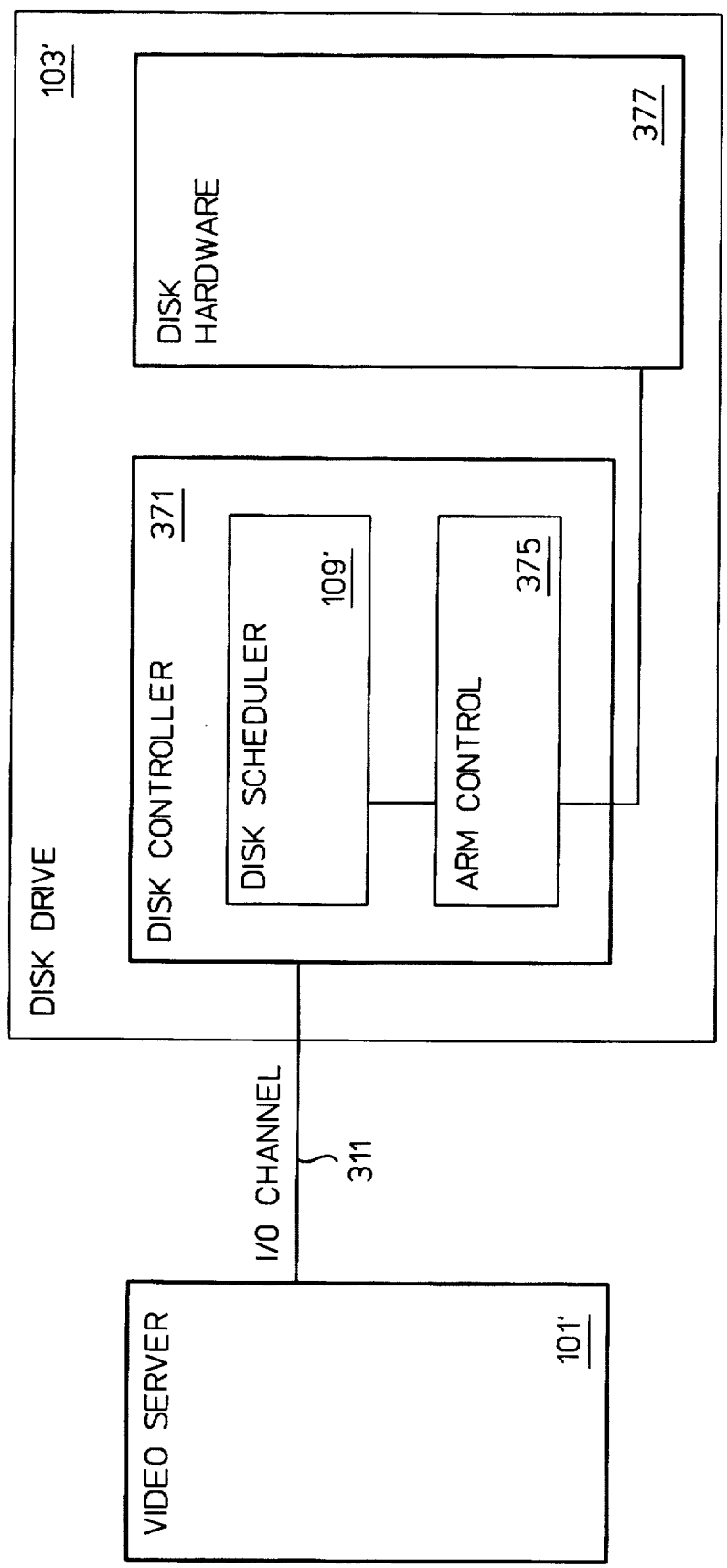
FIG. 3b is a block diagram of an alternative embodiment video server wherein a disk scheduler according to the invention is included in a disk drive unit.

FIG. 3a is a block diagram of a video server 101 including a disk scheduler 109. In the embodiment shown in FIG. 3a, the disk scheduler 109 is a component of the video server 101. FIG. 3b is a block diagram of an alternative embodiment in which a disk scheduler 109' is located in the disk drive unit 103' rather than in the video server 101'.

In the embodiment of FIG. 3a, the disk scheduler 109 contains a request queue 301. As the video server 101 delivers video programming to viewer sets 107, requests for video data are placed in the request queue 301. Each request has associated with it a deadline by which time the request must be serviced to be considered timely. The requests also contain the disk location of the requested data. The request queue 301 is organized in order of deadline. The request with the earliest deadline is located at the head of the queue 301. The video server 101 enters requests into the request queue 301 by invoking an "ENQUE" procedure of a queue manager 302. The ENQUE procedure causes the requests in the queue 301 to be ordered according to their respective deadlines.

The disk scheduler 109 also contains a data structure 303, e.g., a register, for storing the current arm location of the disk drive arm 209, and a data structure 305 for storing the threshold and window size parameters, which may also be stored in registers. These parameters are discussed in greater detail below.

According to a preferred embodiment of the present invention, the disk scheduler 109 operates according to a window based real-time disk scheduling algorithm, called RT-WINDOW, for video or media servers, which overcomes the drawbacks and limitations of existing real-time and non-real-time algorithms.

Figure 4:
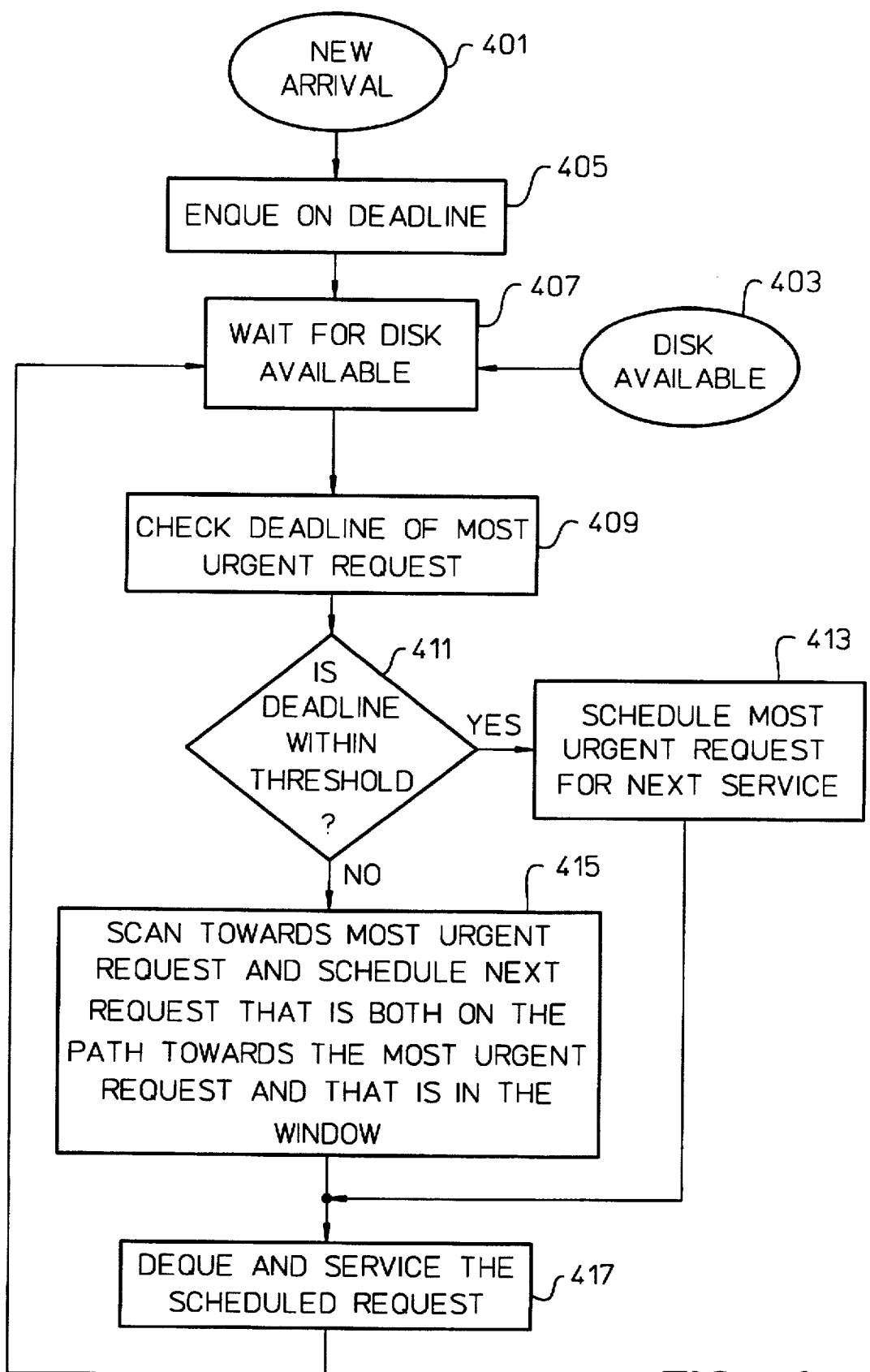
FIG. 4 is a flow-chart showing the method of scheduling disk drive requests according to the present invention.

FIG. 4 is a flow-chart showing the operation of the disk scheduler 109, according to the present invention. The operation of the scheduler 109 is discussed herein in conjunction with FIGS. 5 and 6.

Figure 5:
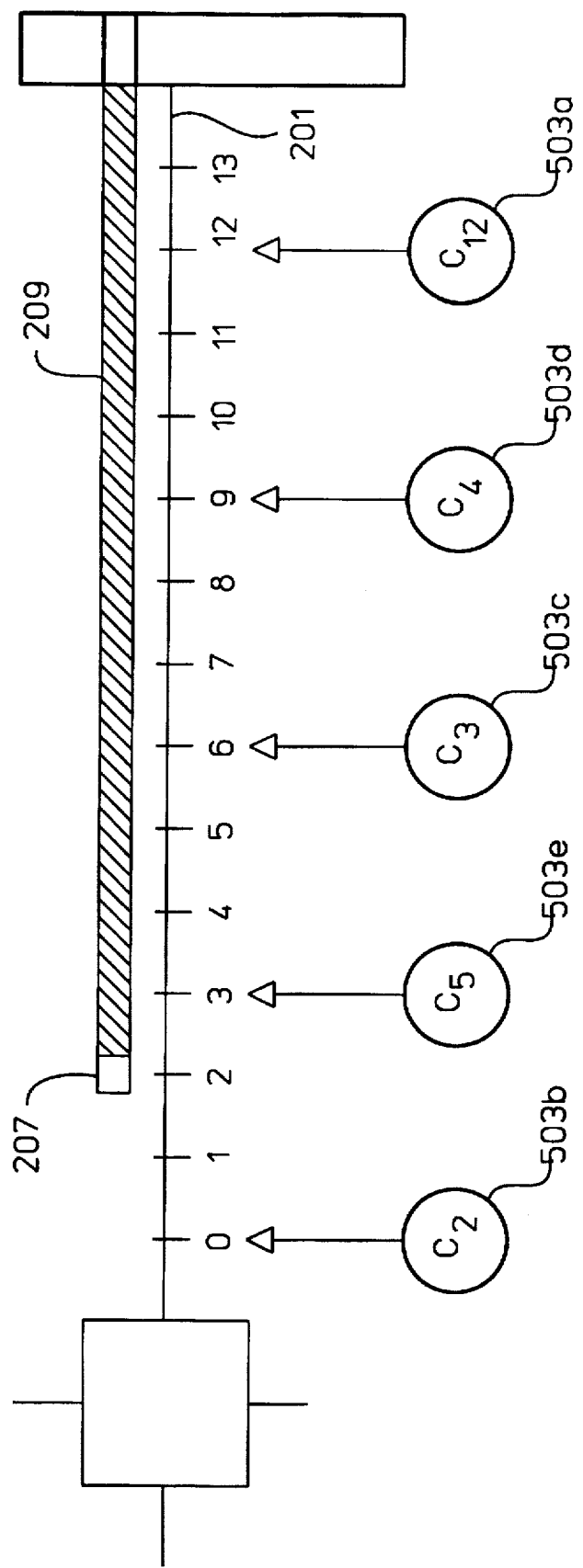
FIG. 5 is an exemplary cross-section of a disk platter showing the disk locations of a number of disk access requests.
Figures 6A, 6B:
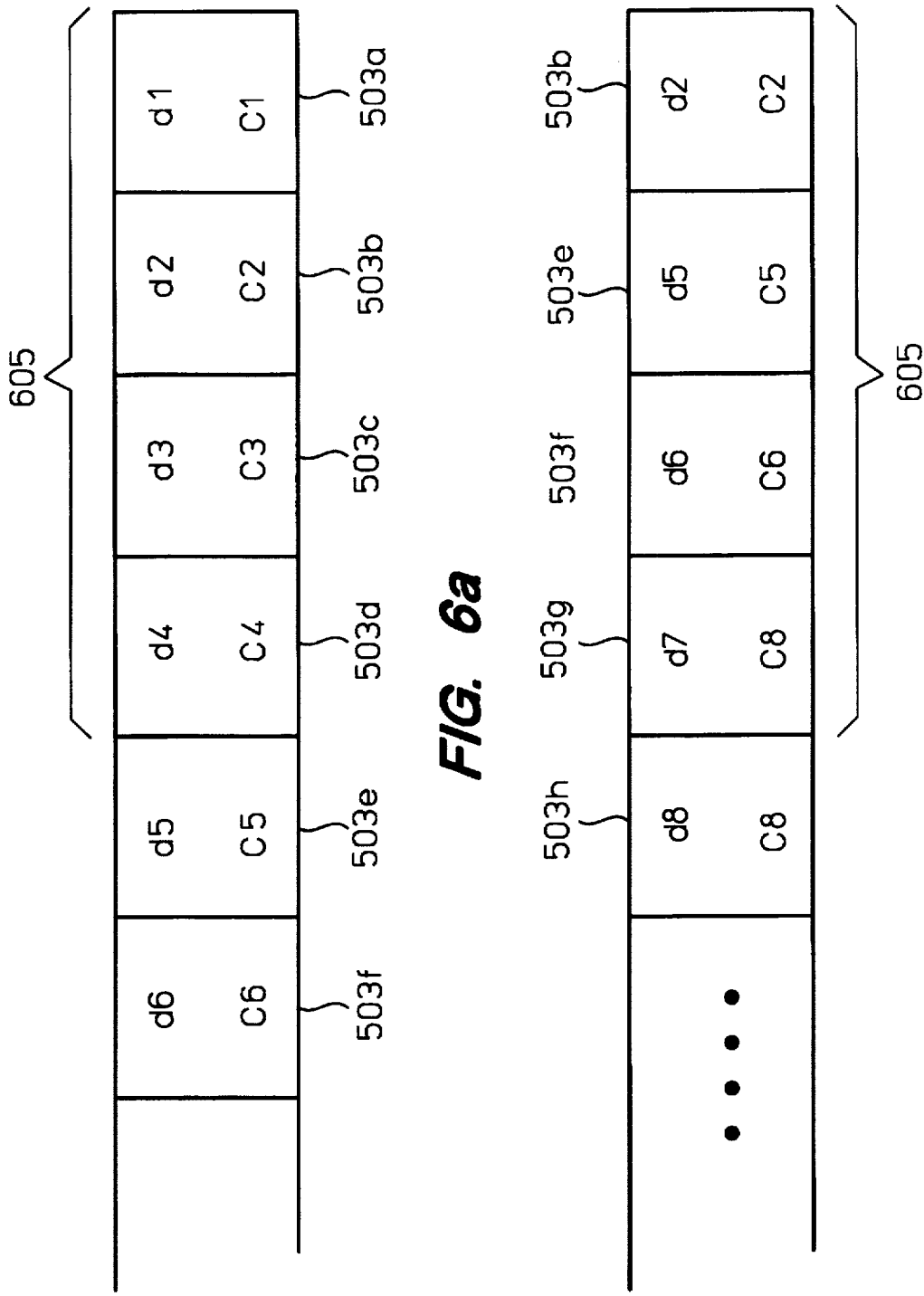
FIG. 6a is a schematic illustration of a disk access request queue.
FIG. 6b is a schematic illustration of the disk access request queue of FIG. 6a at a later point in time.

FIG. 5 is a cross-sectional view of a disk platter 201 and FIGS. 6a and 6b are illustrations of queue 301. In the example, five requests 503a-e are located on the platter 201. In FIG. 6a, six requests 503 have been stored in the queue 301. Each request 503 carries a deadline $d_i$ and has a cylinder address $c_i$. The addresses are also indicated in FIG. 5. While the present invention is described in terms of cylinder addresses, the invention is also applicable to logic block addresses (LBA).

In the example of FIG. 5, for illustrative purposes, the disk has been divided into thirteen cylinders. A person skilled in the art will know that the actual number of cylinders for a disk drive is much greater than thirteen.

The request 503a has the earliest deadline, $d_1$, and, thus, is the most urgent request. Request 503b has the next earliest deadline, $d_2$, and so on, with $d_1$ being earlier than $d_2$, and $d_2$ earlier than $d_3$, etc.

The procedure of FIG. 4 is driven by two events: a new arrival of a disk access request, event 401, and the disk becoming available for a disk access, event 403. When a new access request arrives to the scheduler, the scheduler 109 invokes the queue manager 302 ENQUE procedure to insert the request into the request queue 301 in order of deadline such that the most urgent request is always at the head of the queue followed by the next most urgent request, and so on, step 405.

Following the insertion of a request into the queue 301, the procedure waits until the disk drive becomes available, wait state 407. When the disk available event occurs, event 403, the scheduler proceeds from wait state 407 to schedule the next access request to service.

The first n requests of the queue are contained in a window 605 of size n. In the embodiment shown in the example illustration of FIG. 6, the window 605 contains four (4) requests 503. In a preferred embodiment the window size is an adjustable parameter of the disk scheduler 109.

When scheduling requests, the disk scheduler 109 determines whether the deadline of the most urgent request (in the example, request 503a) will expire within a certain threshold, step 409. To make that determination, the scheduler 109 compares the earliest deadline (in the example $d_1$) to the current time. If the difference is less than the threshold (decision step 411), the scheduler 109 schedules the most urgent request (503a) to be serviced next, step 413, which will cause the disk arm 209 to move directly to the address for the most urgent request.

If the difference between the deadline and the current time is greater than the threshold, the scheduler 109 invokes queue scanner 307 to scan towards the most urgent request 503a, step 415. Scanning is an operation in which the scheduler will cause the arm 209 to move in a particular direction. The scan logic 307 schedules for service, during the scan, the next request 503 that is on the path from the current arm location to the location of the most urgent request 503a that is in the window 605.

In the illustration of FIGS. 5 and 6, the arm 209 is positioned such that the read/write head 207 is located at cylinder 2. The cylinder address for the most urgent request is $C_1$, which is located at cylinder 12. Depending on the deadline tightness of the most urgent request, 503a, the disk scheduler 109 decides whether to serve the most urgent request 503a first or whether to scan (decision 411). If the most urgent request 503a has room to wait, as indicated by the difference between its deadline and the current time being greater than the threshold, then the scheduler scans towards the most urgent request 503a and schedules for next service the first request encountered in the path towards cylinder 12 that is within the window 605, in this case request 503c (step 415). Note that: (a) request 503b is not selected because it is not in the direction towards request 503a at cylinder 12, and (b) request 503e is not selected because it is not in the window 605.

Subsequent to the execution of step 415 or 413 a request has been scheduled and the scheduler moves on to issue commands to the disk drive 103 to process the request, step 417. These commands are issued using the disk access instructions 309 of the disk scheduler 109. Typically, the read instructions 309 issues the command to the disk drive to return the data stored at a particular address. Thus, at such times that the disk scheduler 109 issues a particular read instruction, it updates the current arm location address 303.

When a request has been scheduled, the disk scheduler removes it from the request queue using the queue manager 302 procedure DEQUE. The queue is continuously maintained in order of deadline.

After issuing the disk access instructions, the scheduler returns to the wait state 407. If while in the wait state 407 a new access request arrives, event 401, the wait is interrupted and the scheduler enters the new request into the queue 301. On the other hand, if a disk available event occurs, such as the completion of the previously issued command, the scheduler schedules the next request 503, using the procedure described above.

As requests are scheduled for servicing they are removed from the queue 301. FIG. 6b is an illustration of the queue 301 of the example of FIG. 6a subsequent to several scan operations 415. Requests 503a, 503d, and 503c were scheduled during these scans, serviced and removed from the queue 301. Request 503b has become "the most urgent" request. New requests 503g and 503h have been added.

Returning to FIG. 3b, in the embodiment of a disk scheduler according to the present invention shown therein, the disk scheduler 109' is made part of the disk controller 371 resident on the disk drive 103'. The disk controller 371 receives input/output (I/O) instructions from the video server 101' via an I/O channel 311. The disk scheduler 109' issues disk access instructions including disk arm control instructions 375 to the disk hardware 377 (e.g., the arm 209, the disk platters 201, the read/write heads 207). The disk scheduler 109' operates according to the procedure described in conjunction with FIG. 4 above.

The scheduler 109 has a number of advantages over prior art disk schedulers. First, the scheduler 109 is "real-time" in that it increases the likelihood of each request meeting its deadline, which differentiates it from all of the non-real-time algorithms. At each scheduling point, if the remaining life time for the most urgent request is very close, then the algorithm will serve that request immediately.

Second, seek optimization is performed, but only when the request with the earliest deadline is guaranteed to meet its deadline. That is different from the prior art real-time algorithm EDF in that in EDF no seek optimization is performed. Furthermore, the present scheduler differs from the FD-SCAN algorithm, in that in FD-SCAN the seek optimization is always performed regardless the time constraint of the most urgent request. Therefore, in FD-SCAN the most urgent request is more likely to miss its deadline.

Third, the present scheduler only scans within the window 605, i.e., the request being selected for service always has a relative tight time constraint, whereas FD-SCAN will select any request on the scan path, even though its deadline is still far away. In the RT-WINDOW scheduler of the present invention, the window mechanism will reduce the chance for requests with tight time constraints to miss their deadlines.

Finally, because the arm 209 always moves towards the most urgent request, after serving a request on the path towards it, the remaining seek distance to the most urgent request is always reduced.

The RT-WINDOW scheduler 109 has two adjustable parameters, Threshold and Window-Size. The performance of the scheduler 109 can be tuned by carefully adjusting these two parameters.

Threshold is used to decide whether or not to serve the most urgent request. The threshold should be set to be sufficiently large to include time to service both the most urgent request and at least one other request. One possible value for this parameter could be the sum of the estimated worst case disk I/O response times, which include the disk access time plus the channel transfer time, for these requests.

Window-Size is a parameter that determines the scheduler's behavior. Decreasing window size will put more weight on requests' time constraints rather than seek optimization. In the extreme case of Window-Size=1, the algorithm degenerates to the EDF algorithm. On the other hand, increasing window size will put more weight on the seek optimization than time constraints. If the Window-Size parameter is set to very large (e.g. 1000), then the algorithm degenerates to FD-SCAN if it decides to scan. Experimental results show that a window size of 3 to 5 is appropriate for a wide range of workloads, and within this range, the window size is not very sensitive to the overall system performance.

Note that, unlike SCAN-EDF whose effectiveness depends on the workload, i.e., if there is no requests carrying the same deadline it degenerates to EDF, the RT-WINDOW scheduler 303 is totally independent of the workload. It can be set to behave like EDF or FD-SCAN by adjusting the scheduler's parameter(s). Therefore, the scheduler 109 provides a great flexibility.

In an alternative embodiment, with certain hardware support, as required by the STF algorithm described above, the RT-WINDOW algorithm can be easily extended to perform not only seek optimization but also rotational latency optimizations. In this embodiment the scheduler, instead of scan, selects the request with the minimum service time (defined as the sum of seek time and rotational latency) within the window. Having knowledge of the sum of seek and rotational latency also helps to more precisely estimate the Threshold parameter.

An alternative embodiment is a hybrid system of the disk scheduler 109 of FIG. 3a and of disk scheduler 109' of FIG. 3b. In this alternative both the server and the disk drive have request queues. Similarly, both the server and the disk drive have window based disk schedulers according to the present invention as described above.

As a person skilled in the art will realize, while the new RT-WINDOW scheduler has been described in the context of video-on-demand, the present invention can also be used in other applications, such as real-time transaction processing, etc. Because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of controlling a disk drive with a movable arm, wherein said arm at any given point in time has a current location, comprising the steps of:
   defining a threshold parameter;
   accepting a plurality of disk access requests, each having a prescribed deadline and a disk address, wherein the disk access request with the most urgent deadline is the most urgent request;
   storing the disk access requests in a queue having a front, such that the most urgent disk access request is at the front of the queue and such that the queue is sorted according to deadlines;
   defining a window in said queue wherein said window contains a certain number of disk access requests in the front of said queue; and
   processing requests in said queue by:
      determining how much time is left before the deadline of the most urgent request in the queue expires;
      if said time is less than the threshold, serve the most urgent request;
      otherwise scan from said current arm location towards the disk address of said most urgent request; and during said scan schedule the first encountered request that is in the scan path and that is in the window.

2. The method of claim 1, wherein said step of determining how much time is left before the deadline of the most urgent request expires comprises comparing the deadline for said most urgent request to the current clock time.

3. The method of claim 1, further comprising the step of defining the size of said window.

4. The method of claim 1, wherein subsequent to being serviced a request is removed from said queue and from said window.

5. A disk control mechanism for controlling the operations of a movable arm disk drive wherein at any given point in time, said movable arm has a current location, comprising:
- a disk access scheduler operable to accept disk access requests having a deadline and a disk location, including:
- a queue data structure for storing said requests, wherein one request is more urgent than any other request in said queue;
- a window in said queue, wherein said window contains a certain number of requests with deadlines to expire sooner than all other requests; and
- a logic to determine whether said most urgent request has a deadline to expire sooner than tolerated by a set threshold, and in such cases to service said most urgent request prior to any other request, otherwise to scan towards said most urgent request and to schedule any requests with disk locations between said current arm location and said most urgent request.

6. A data server, for real-time presentation of data stored on said data server, comprising:
- at least one central processing unit;
- at least one movable arm disk drive for storing data for presentation to customers, said disk drive arm having a current location;
- a disk scheduler for each said movable arm disk drive, operable to accept requests for data stored on said disk drive, and to store said requests in a queue data structure such that a given number of requests with deadlines sooner to expire than all other requests are located within a window in said queue; and
- wherein said disk schedulers are operable to determine whether a request in said queue that is more urgent than any other request has a deadline to expire prior to a permitted threshold, in such case to schedule to service such request next, otherwise to commence scanning from said disk drive arm's current location toward said location of said most urgent request and scheduling for service all requests in said window and encountered during said scanning operation.

7. The data server of claim 6, wherein said threshold and said given number of requests in said window are adjustable parameters of said disk schedulers.

* * * * *